United States Patent [19]

Sasaki et al.

[11] Patent Number: 4,981,830

[45] Date of Patent: Jan. 1, 1991

[54] PROCESS FOR PREPARING IRON-ANTIMONY-PHOSPHORUS-CONTAINING CATALYST FOR FLUIDIZED BED PROCESS

[75] Inventors: Yutaka Sasaki; Hiroshi Utsumi; Masato Otani; Kazuo Morishita, all of Kanagawa, Japan

[73] Assignee: Nitto Chemical Industry Co., Ltd., Tokyo, Japan

[21] Appl. No.: 290,326

[22] Filed: Dec. 27, 1988

[30] Foreign Application Priority Data

Dec. 25, 1987 [JP] Japan ................. 62-329200

[51] Int. Cl.$^5$ ............ B01J 23/18; B01J 27/182; B01J 27/185; C01C 3/02
[52] U.S. Cl. ................... 502/214; 423/376; 502/209; 502/210; 502/211; 502/212; 502/213
[58] Field of Search ............. 502/213, 214, 209, 210, 502/211, 212

[56] References Cited

U.S. PATENT DOCUMENTS

| | | | |
|---|---|---|---|
| 3,657,155 | 4/1972 | Yoshino et al. | 252/456 |
| 3,686,138 | 8/1972 | Yoshino et al. | 502/249 |
| 4,413,155 | 11/1983 | Suresh et al. | 585/417 |
| 4,414,133 | 11/1983 | Otake et al. | 502/214 |
| 4,461,752 | 7/1984 | Sasaki et al. | 423/376 |
| 4,511,548 | 4/1985 | Attig et al. | 423/376 |
| 4,590,173 | 5/1986 | Sasaki et al. | 502/214 |

FOREIGN PATENT DOCUMENTS

| | | |
|---|---|---|
| 0089118 | 9/1983 | European Pat. Off. . |
| 2438464 | 2/1975 | Fed. Rep. of Germany . |
| 1553801 | 10/1975 | United Kingdom . |

OTHER PUBLICATIONS

Abstract from Word Patent Index Account No.:-76-19457X/11 for Japanese Patent Application No. 54 39839.

Chemical Abstracts 85:23172b for Japanese Patent Application No. 54 39839.

Primary Examiner—Paul E. Konopka
Attorney, Agent, or Firm—Sughrue, Mion, Zinn, Macpeak & Seas

[57] ABSTRACT

A process for preparing a metal oxide catalyst for a fluidized bed process, which comprises adjusting the pH of an aqueous slurry containing an iron compound, an antimony compound, a phosphorus compound, and a silica carrier material as essential elements, with the atomic ratio of phosphorus to antimony being at least 0.1:1, to a pH of 3 or less, spray drying the slurry, and calcining the resulting particles; which catalyst exhibits excellent activity and physical properties suitable for use in a fluidized bed process and can be obtained with good reproducibility.

2 Claims, No Drawings

PROCESS FOR PREPARING IRON-ANTIMONY-PHOSPHORUS-CONTAINING CATALYST FOR FLUIDIZED BED PROCESS

FIELD OF THE INVENTION

This invention relates to a catalyst containing iron, antimony and phosphorus. More particularly, it relates to an iron-antimony-phosphorus-containing catalyst which catalyzes oxidation, oxidative dehydrogenation, or ammoxidation of organic compounds and possesses physical properties suitable for use in a fluidized catalyst bed.

BACKGROUND OF THE INVENTION

Metal oxide catalysts containing iron, antimony and phosphorus are known to be useful in production of aldehydes by oxidation of organic compounds, production of dienes, alkenylbenzenes, unsaturated aldehydes or unsaturated acids by oxidative dehydrogenation of organic compounds, and production of nitriles by ammoxidation of organic compounds. For example, ammoxidation of propylene is described in JP-B-38-19111 (the term "JP-B" as used herein refers to an "examined Japanese patent publication"), and U.S. Pat. Nos. 3,542,843, 3,591,620 and 3,988,359; and ammoxidation of methanol is described in JP-B-54-39839 and U.S. Pat. No. 4,511,548.

The antimony-containing oxide catalysts which can be used in the reactions stated above involve problems, such as poor reproducibility and operability in the preparation thereof and difficulty in assuring high strength. As a result, some improvements have been made on a process for preparing the catalyst as described in JP-B-46-3456 and JP-B-46-3457, and U.S. Pat. Nos. 3,341,471, 3,657,155 and 3,686,138.

These conventionally proposed processes, however, do not always satisfy both activity and physical properties of the catalyst, and the problem of reproducibility of preparation still remains unsolved. In particular, in the preparation of catalysts having a high phosphorus content as in the catalyst of the present invention, direct application of conventional processes proposed for preparing antimony-containing catalysts fails to attain satisfactory results. For instance, the processes disclosed in U.S. Pat. Nos. 3,657,155 and 3,686,138 are excellent techniques for preparing iron-antimony-containing catalysts suitable for a fluidized bed process. However, it is difficult for these processes to produce catalysts containing a relatively large amount of phosphorus while retaining activity and physical properties for use in a fluidized bed process. This is assumed to be because the presence of a large amount of a phosphorus component not only inhibits oxidation of the antimony but greatly changes the properties of the slurry reducing its stability.

In addition, the above-cited two processes are limited in terms of the antimony compound which can be used as a raw material and conditions for preparing the catalyst. In more detail, according to the process of U.S. Pat. No. 3,657,155, use of a trivalent antimony compound as an antimony component is essential; the slurry containing this particular antimony compound should further contain ferric ion and nitrate ion; and the slurry should be adjusted to a pH of about 7 or less and heat-treated at a temperature of from about 40° to 150° C. prior to spray drying. Although the process of U.S. Pat. No. 3,686,138 does not require the co-presence of ferric ion and nitrate ion in the slurry containing an antimony compound, it essentially requires use of a pentavalent antimony compound as an antimony compound; and in a similar manner to the process of U.S. Pat. No. 3,657,155, the slurry before spray drying should be adjusted to a pH of about 7 or less and heat-treated at a temperature of from about 40° to 150° C. at that pH.

SUMMARY OF THE INVENTION

An object of this invention is to provide a process for preparing an iron-antimony-phosphorus-containing catalyst for a fluidized bed process which has excellent catalytic activity as well as physical properties.

Another object of this invention is to provide a reproducible process for preparing the above-described catalyst with technical and economical advantages.

As mentioned above, the processes of U.S. Pat. Nos. 3,657,155 and 3,686,138 are recommended for the preparation of antimony-containing solid catalysts suitable for a fluidized bed process. However, these processes are incapable of producing a catalyst containing a large quantity of a phosphorus component and exhibiting satisfactory activity and physical properties. In addition, the antimony compound which can be used is limited and the heat treatment of the slurry under a specific pH condition prior to spray drying is necessary.

It has now been found that, in case of using a relatively large amount of a phosphorus component as a part of the raw materials, the above-described limitations can be removed by adjusting the pH of the slurry to 3 or less prior to spray drying, thereby providing a catalyst possessing satisfactory activity combined with satisfactory physical properties. It has been reported where a phosphorus compound is used as one of optional components to improve catalytic activity. In these cases, however, the ratio of phosphorus to antimony is very small, and is insufficient to remove the limitations stated above.

Accordingly, the present invention provides a process for preparing a metal oxide catalyst for a fluidized bed process which comprises adjusting the pH of an aqueous slurry containing an iron compound, an antimony compound, a phosphorus compound, and a silica carrier material as essential elements, with the atomic ratio of phosphorus to antimony being at least 0.1:1, to a pH of 3 or less, spray drying the slurry, and calcining the resulting particles.

DETAILED DESCRIPTION OF THE INVENTION

The catalyst prepared by the process of this invention, though varying depending on the kinds and amounts of optional components other than the four essential components, generally has a composition represented by the empirical formula:

$$Fe_aSb_bP_cX_dQ_eR_fO_g(SiO_2)_h$$

wherein
X represents at least one element selected from the group consisting of V, Mo, and W;
Q represents at least one element selected from the group consisting of Li, Na, K, Cs, Be, Mg, Ca, Sr, Ba, Sc, Y, La, Ce, Pr, Nd, Sm, Th, U, Ti, Zr, Hf, Nb, Ta, Cr, Mn, Re, Co, Ni, Ru, Rh, Pd, Os, Ir, Pt, Cu, Ag, Au, Zn, Cd, Hg, Al, Ga, In, Tl, Ge, Sn, and Pb;

R represents at least one element selected from the group consisting of B, As, Bi, Se, and Te; and a, b, c, d, e, f, g, and h each represents an atomic ratio of the respective element, wherein a is from 5 to 15;

b is from 5 to 100, preferably from 10 to 60;

c is from 1 to 30, preferably from 3 to 20;

d is from 0 to 10;

e is from 0 to 15;

f is from 0 to 10;

g represents a number of oxygen atoms as determined corresponding to the oxides formed by combining the above-mentioned components; and h is from 10 to 200; provided that the P/Sb atomic ratio is at least 0.1:1.

The optional components other than iron, antimony, phosphorus, and silica can be selected appropriately so as to control reaction selectivity, reaction rate, physical properties of the catalyst, and the like. More specifically, the X component contributes to an increase of reaction rate; the Q component to an improvement in physical properties of the catalyst and control of by-products; and the R component to an improvement of selectivity, respectively.

The iron component which can be used in the present invention can be selected from ferric nitrate, iron dissolved in nitric acid, and an iron salt of an organic acid such as oxalate, citrate, etc., with a nitric acid salt being preferred.

The antimony component which can be used includes antimony trioxide, antimony tetroxide, antimony pentoxide, antimonic acid, polyantimonic acid, etc., with antimony trioxide being preferred.

The phosphorus compound which can be used includes orthophosphoric acid, polyphosphoric acids, phosphorus pentoxide, diammonium hydrogenphosphate, ammonium dihydrogenphosphate, ammonium phosphate, etc., with orthophosphoric acid being preferred.

The silica carrier material which can be used includes preferably silica sol. A part of it may be replaced with white carbon, fumed silica, silica hydrogel, etc.

Where the optional catalyst components represented by X, Q, and R of the above-described empirical formula are incorporated into the catalyst, these components can be used in the form of their nitrates, carbonates, sulfates, hydroxides, oxides or other compounds.

According to the present invention, the aqueous slurry containing the iron compound, antimony compound, phosphorus compound, and silica carrier material as essential components, with a P/Sb atomic ratio being at least 0.1:1, preferably from 0.15:1 to 3:1, and more preferably from 0.2:1 to 2:1, is adjusted to a pH of 3 or less, preferably 2 or less, and more preferably 1 or less, and then spray dried, followed by calcination.

The pH adjustment is carried out using organic or inorganic acids, or bases. There are used, for instance, acids such as formic acid, acetic acid, nitric acid, sulfuric acid, phosphoric acid, etc., and bases such as aqueous ammonia, sodium hydroxide, potassium hydroxide, organic amines, etc.

If the slurry has a pH higher than 3, it is difficult to dry the slurry by spraying due to its high viscosity, and the slurry concentration should be reduced accordingly to conduct the spray drying. A slurry pH of higher than 3 also results in a deterioration in the performance properties of the resulting catalyst, particularly the physical properties.

Heat-treatment of the slurry is not always necessary in the present invention. However, from the standpoint of stabilizing the properties of the slurry, it is desirable for the slurry after pH adjustment to 3 or less to be heat-treated at a temperature of 40° C. or higher, preferably 60° C. or higher. It should be noted, however, that the physical properties of the finally obtained catalyst are reduced by the heat-treatment if the slurry to be heat-treated has a relatively high pH. Therefore, the heat-treatment, if conducted, is preferably carried out at a lower pH, for example, 0 or lower, and then the slurry is adjusted to a pH of from 0 to 3, preferably from 0 to 2, prior to spray drying. By such pH adjustment, difficulties in operation, such as evolution of a large quantity of acidic gases at the time of spray drying, are avoided.

Spray drying of the slurry can be carried out by means of a commonly employed spray dryer, e.g., a disk type, a high-pressure nozzle type, and a two-fluid nozzle type. After the spray drying, the dried particles are calcined at a temperature of from 200° to 600° C. and then at a temperature of from 500° to 900° C. for a period of from 0.1 to 50 hours, preferably 1 to 10 hours.

The catalyst prepared by the process of the present invention can be used for oxidation, oxidative dehydrogenation, or ammoxidation of organic compounds or the like processes. Conditions of use of the catalyst can be selected appropriately based on knowledge possessed by one skilled in the art.

Typical processes for the oxidation, oxidative dehydrogenation and ammoxidation of organic compounds are disclosed, for example, in U.S. Pat. Nos. 2,941,007 (oxidation), 2,995,320 (oxidative dehydrogenation), 2,746,843 (ammoxidation) and 2,904,580 (ammoxidation), respectively.

The catalyst of the present invention is particularly suitable for the production of hydrogen cyanide through ammoxidation of methanol. Suitable reaction conditions therefor are as follows: the oxygen/methanol molar ratio in the mixed gas supplied is from 0.5:1 to 15:1, preferably from 1:1 to 10:1; the ammonia/methanol molar ratio in the mixed gas supplied is from 0.5:1 to 3:1, preferably from 0.7:1 to 2.5:1; a reaction temperature of from 350° to 500° C.; a contact time of from 0.1 to 20 seconds; and a reaction pressure of from normal pressure to 2 kg/cm$^2$G.

Effects of the present invention are summarized below. In the conventional processes for preparing a metal oxide catalyst for oxidation, oxidative dehydrogenation or ammoxidation of organic compounds or the like process, in which an aqueous slurry containing an iron compound, an antimony compound, a phosphorus compound, and a silica carrier material is spray dried, the presence of a high phosphorus content in the slurry has made it difficult to obtain a satisfactory catalyst particularly suitable for a fluidized bed process. According to the present invention, a catalyst for a fluidized bed process which exhibits excellent activity and physical properties is provided without any limitation on the kind of antimony compound used as a raw material and any requirement of heat treatment under a specific pH condition prior to spray drying.

The present invention is now illustrated in greater detail with reference to the following Examples and Comparative Examples, but it should be understood that the present invention is not deemed to be limited thereto. In these Examples, all the percents are by weight unless otherwise indicated.

(the test method was as hereinafter described) are summarized in Table 1 below.

TABLE 1

| | | Conditions of Slurry Preparation | | Conditions of Heat Treatment | | Crystal Phase Observed on X-Ray Diffraction | Final Calcination Temperature (°C.) | Attrition Resistance (R Value) |
|---|---|---|---|---|---|---|---|---|
| Experiment | Catalyst Composition | pH Adjusted | Heat Treatment | Temperature (°C.) | Time (hr) | | | |
| A* | $Fe_{10}Sb_{25}P_{10}O_{90}(SiO_2)_{60}$ | 1 | Not conducted | — | — | $Sb_2O_3$ | 750 | 1.9 |
| B* | " | 1 | Conducted | 100 | 2 | $Sb_2O_3$ | 750 | 2.3 |
| C | $Fe_{10}Sb_{25}O_{65}(SiO_2)_{60}$ | 1 | Not conducted | — | — | $Sb_2O_3$ | 750 | 21.8 |
| D** | " | 1 | Conducted | 100 | 2 | $FeSbO_4$ | 750 | 3.1 |
| E** | $Fe_{10}Sb_{25}P_{10}O_{90}(SiO_2)_{30}$ | 4 | Conducted | 100 | 2 | $Sb_2O_3$ | 700 | 9.3 |
| F** | $Fe_{10}Sb_{25}O_{90}(SiO_2)_{30}$ | 4 | Conducted | 100 | 2 | $FeSbO_4$ | 700 | 2.8 |

Note:
*Corresponding to the process of the present invention.
**Corresponding to the process of U.S. Pat. No. 3,657,155.

REFERENCE EXAMPLE

Prior to conducting the working examples, Experiments A to F were conducted in order to demonstrate various situational differences between the iron-antimony-silicon system and the iron-antimony-phosphorus-silicon system of interest.

Experiment A

A slurry was prepared in the same manner as described in Example 3 hereinafter, and spray dried to prepare a catalyst.

Experiment B

A catalyst was prepared in the same manner as in Experiment A, except that the slurry, was subjected to heat treatment prior to spray drying.

Experiment C

A catalyst was prepared in the same manner as in Experiment A, except that nc phosphorus component was used.

Experiment D

A catalyst was prepared in the same manner as in Experiment B, except that no phosphorus component was used. This experiment corresponds to the process disclosed in U.S. Pat. No. 3,657,155.

Experiment E

A catalyst was prepared in the same manner as in Experiment B, except for using the product prepared through oxidizing metallic antimony with nitric acid as the raw material for an antimony component, adjusting the pH of the slurry to 4, and conducting the final calcination at 700° C. for 3 hours. Because the slurry had a high viscosity, water was added thereto to reduce the slurry concentration prior to spray drying.

Experiment F

A catalyst was prepared in the same manner as in Experiment E, except that no phosphorus component was used and no water was added to the slurry prior to spray drying.

The composition of each catalyst prepared above, the conditions for the slurry preparation, the results of X-ray diffraction of the slurry (after heat treatment, if conducted), and the attrition resistance of the catalyst Consideration In Experiments A and B wherein the slurry contains P, the heat treatment of the slurry was not always necessary. The reaction between Fe and Sb does not take place even on heat treatment.

In Experiments C and D wherein the slurry does not contain P, the strength of the catalyst is quite poor unless the slurry is heat-treated. The reaction of Fe and Sb is caused by the heat-treatment.

In Experiments E and F wherein the slurry is adjusted to a pH of higher than 3, if the slurry contains P, not only is the strength of the catalyst extremely deteriorated but also the shape of the catalyst is irregular.

EXAMPLE 1

A catalyst having a composition represented by the empirical formula $Fe_{10}Sb_{25}P_3O_{72.5}(SiO_2)_{30}$ was prepared as follows.

547 g of an antimony trioxide powder (I) was weighed out. 0.65 liter of nitric acid (specific gravity =1.38) and 0.81 liter of water were mixed and heated, and 83.8 g of an electrolytic iron powder was added thereto in small portions to prepare a solution (II). 1,354 g of silica sol ($SiO_2$ content: 20%) (III) was weighed out. 52.0 g of phosphoric acid (phosphoric acid content: 85%) (IV) was weighed out.

(II), (IV), and (I) ware added in this order to (III) while thoroughly stirring, and 15% aqueous ammonia was added thereto in small portions to adjust to a pH of 2. The resulting slurry was spray dried by using a rotating disk type spray dryer in a conventional manner. The resulting fine spherical particles were calcined at 200° C. for 4 hours, then at 400° C. for 4 hours, and finally at 800° C. for 3 hours.

EXAMPLE 2

A catalyst having a composition represented by the empirical formula $Fe_{10}Sb_{25}P_7O_{82.5}(SiO_2)_{30}$ was prepared in the same manner as in Example 1, except that the slurry (pH=2) was heat-treated at 80° C. for 1 hour and then adjusted to a pH of 1 prior to the spray drying and that the final calcination was conducted at 750° C. for 3 hours.

EXAMPLE 3

A catalyst having a composition represented by the empirical formula $Fe_{10}Sb_{25}P_{10}O_{90}(SiO_2)_{60}$ was prepared in the same manner as in Example 1, except that the slurry was adjusted to a pH of 1 and that the final calcination was conducted at 750° C. for 3 hours.

EXAMPLE 4

A catalyst having a composition represented by the empirical formula $Fe_{10}Sb_{20}P_{10}Mo_{0.5}O_{81.5}(SiO_2)_{60}$ was prepared in the same manner as in Example 1, except that the slurry was adjusted to a pH of 0.2 and that the final calcination was conducted at 800° C. for 3 hours.

EXAMPLE 5

A catalyst having a composition represented by the empirical formula $Fe_{10}Sb_{20}P_8V_{0.3}O_{75.75}(SiO_2)_{60}$ was prepared in the same manner as in Example 1, except that the slurry was adjusted to a final pH of 0.5 and that the final calcination was conducted at 800° C. for 3 hours.

EXAMPLE 6

A catalyst having a composition represented by the empirical formula $Fe_{12}Sb_{25}P_{10}W_{0.5}O_{94.5}(SiO_2)_{60}$ was prepared in the same manner as in Example 1, except that the slurry was adjusted to a pH of 0.5 and then heat-treated at 100° C. for 1 hour and that the final calcination was conducted at 850° C. for 3 hours.

EXAMPLE 7

A catalyst having a composition represented by the empirical formula $Fe_{10}Sb_{20}P_{10}V_{0.3}Mo_{0.2}Cu_2Ni_2Te_{0.1}O_{85.55}(SiO_2)_{60}$ was prepared in the same manner as in Example 1, except that the slurry obtained by mixing the raw materials was heat-treated at 95° C. for 2 hours and then adjusted to a pH of 1 prior to spray drying and that the final calcination was conducted at 700° C. for 3 hours.

EXAMPLE 8

A catalyst having a composition represented by the empirical formula $Fe_{10}Sb_{20}P_5V_{0.2}Co_1Mn_1Mg_{0.5}Bi_{0.2}B_{0.2}O_{71.1}(SiO_2)_{60}$ was prepared in the same manner as in Example 1, except that the slurry was adjusted to a pH of 0 and that the final calcination was conducted at 850° C. for 3 hours.

EXAMPLE 9

A catalyst having a composition represented by the empirical formula $Fe_{10}Sb_{20}P_{15}V_{0.3}K_{0.2}Ce_{0.5}Ti_1Cr_{0.5}Zn_{0.5}O_{97.6}(SiO_2)_{60}$ was prepared in the same manner as in Example 1, except that the slurry was adjusted to a pH of 0 or lower and that the final calcination was conducted at 750° C. for 3 hours.

EXAMPLE 10

A catalyst having a composition represented by the empirical formula $Fe_{10}Sb_{20}P_{10}Mo_{0.5}Zr_2Al_{0.5}Ag_{0.1}Sn_2O_{90.35}(SiO_2)_{60}$ was prepared in the same manner as in Example 1, except that the slurry was adjusted to a pH of 0.5 and that the final calcination was conducted at 700° C. for 3 hours.

EXAMPLE 11

A catalyst having a composition represented by the empirical formula $Fe_8Sb_{15}P_{20}W_1Pb_2La_{0.2}O_{95.3}(SiO_2)_{70}$ was prepared in the same manner as in Example 1, except that the final calcination was conducted at 650° C. for 3 hours.

EXAMPLE 12

A catalyst having a composition represented by the empirical formula $Fe_{10}Sb_{20}P_{10}V_{0.3}Mo_{0.2}Cu_2Ni_2Te_{0.1}O_{85.55}(SiO_2)_{60}$ was prepared as follows.

437 g of an antimony trioxide powder (I) was weighed out. 0.65 liter of nitric acid (specific gravity =1.38) and 0.81 liter of water were mixed and heated, and 83.8 g of an electrolytic iron powder was added thereto in small portions to prepare a solution (II). 2,705 g of silica sol (SiO$_2$ content: 20%) (III) was weighed out. In 100 ml of water was dissolved 5.3 g of ammonium metavanadate to prepare a solution (IV). In 50 ml of water was dissolved 5.3 g of ammonium paramolybdate to prepare a solution (V). In 1 liter of water were dissolved 72.8 g of cupric nitrate, 87.2 g of nickel nitrate, and 3.4 g of telluric acid to prepare a solution (VI).

(II), (I), (IV), (V), and (VI) were added in this order to (III) with thorough stirring, and to the mixture was further added 15% aqueous ammonia in small portions to adjust to a pH of 2. The resulting slurry was heat-treated at 100° C. for 3 hours. To the slurry was added 173 g of a 85% orthophosphoric acid aqueous solution, followed by stirring well to adjust to a pH of 0 or lower. The slurry was then spray dried by means of a rotary disk type spray dryer in a usual manner. The resulting fine spherical particles were calcined at 200° C. for 4 hours, then at 400° C. for 4 hours, and finally at 700° C. for 3 hours.

COMPARATIVE EXAMPLE 1

A catalyst having a composition represented by the empirical formula $Fe_{10}Sb_{20}P_{10}Mo_{0.5}O_{81.5}(SiO_2)_{60}$ (the same composition as in Example 4) was prepared in the same manner as in Example 1, except that the slurry was adjusted to a pH of 4 and that the final calcination was conducted at 800° C. for 3 hours.

COMPARATIVE EXAMPLE 2

A catalyst having a composition represented by the empirical formula $Fe_{12}Sb_{25}P_{10}W_{0.5}O_{94.5}(SiO_2)_{60}$ (the same composition as in Example 6) was prepared in the same manner as in Example 1, except that the slurry obtained by mixing the raw materials was adjusted to a pH of 0.5, then heat-treated at 100° C. for 1 hour, and finally adjusted to a pH of 3.5 prior to the spray drying and that the final calcination was conducted at 850° C. for 3 hours.

COMPARATIVE EXAMPLE 3

A catalyst having a composition represented by the empirical formula $Fe_{10}Sb_{14}P_{1.0}W_{0.5}O_{47}(SiO_2)_{20}$ was prepared as follows.

466 g of an antimony trioxide powder (I) was weighed out. 1,200 ml of nitric acid (specific viscosity =1.38) and 1,600 ml of pure water were mixed and heated to about 80° C., and 127.8 g of an electrolytic iron powder was slowly added thereto to completely dissolve it to prepare a solution (II). In 400 ml of pure water was dissolved 29.8 g of ammonium paratungstate to prepare a solution (III). 26.4 g of 85% phosphoric acid (IV) was weighed out. 1,374 g of silica sol (SiO$_2$ content: 20%) (V) was weighed out.

The components (I) to (V) were mixed and, with thorough stirring, 15% aqueous ammonia was slowly added thereto to adjust to a pH of 2.0. The resulting slurry was heated at 100° C. for 4 hours with thorough stirring. The slurry was then spray dried in a usual manner. The resulting fine spherical particles were calcined at 200° C. for 2 hours, then at 400° C. for 2 hours, and finally at 830° C. for 2 hours.

The composition of each of the catalysts prepared in Examples 1 to 12 and Comparative Examples 1 to 3 and conditions for preparation thereof are summarized in Table 2 below.

The catalytic activity and physical properties of each of these catalysts was evaluated according to the following test methods, and the results obtained are shown in Table 3.

I. Activity Test

The catalyst was packed in a fluidized bed reactor having an inner diameter of 2.5 cm and a height of 40 cm, and ammoxidation of methanol was carried out under atmospheric pressure to produce hydrogen cyanide. The $O_2$ (supplied as air)/$CH_3OH$ molar ratio was 4.3:1, and the $NH_3/CH_3OH$ molar ratio was 1.1:1. The reaction temperature and contact time are shown in Table 3. The catalytic activity was evaluated in terms of yield, conversion, and selectivity, calculated from equations shown below.

$$\text{Yield (\%)} = \frac{\text{Weight (g) of Carbon in Product}}{\text{Weight (g) of Carbon in } CH_3OH \text{ Supplied}} \times 100$$

$$\text{Conversion (\%)} = \frac{\text{Weight (g) of Carbon in } CH_3OH \text{ Consumed by Reaction}}{\text{Weight (g) of Carbon in } CH_3OH \text{ Supplied}} \times 100$$

$$\text{Selectivity (\%)} = \frac{\text{Weight (g) of Carbon in Product}}{\text{Weight (g) of Carbon in } CH_3OH \text{ Consumed by Reaction}} \times 100$$

II. Attrition Test

An attrition test was carried out in accordance with *Test Methods for Synthetic Cracking Catalysts*, American Cyanamid Co., Ltd. 6/31-4m-1/57 known as a strength test method for catalysts for fluid catalytic cracking process. The attrition loss (R) (%) can be calculated by the equation:

$$R = \frac{B}{C - A} \times 100$$

wherein A represents the weight loss (g) of the catalyst due to attrition for 5 hours from the start of the test; B represents the weight loss (g) of the catalyst due to attrition during the period from 5 hours to 25 hours from the start of the test; and C represents the weight loss (g) of the catalyst under test.

The attrition test was carried out by using a catalyst weighing 50 g (C=50 in the above equation). The smaller the R value, the higher the attrition resistance.

TABLE 2

| Example No. | Catalyst Composition (atomic ratio) | pH Adjusted | Heat Treatment |
|---|---|---|---|
| Example 1 | $Fe_{10}Sb_{25}P_3O_{72.5}(SiO_2)_{30}$ | 2 | Not conducted |
| Example 2 | $Fe_{10}Sb_{25}P_7O_{82.5}(SiO_2)_{60}$ | <0 | Conducted |
| Example 3 | $Fe_{10}Sb_{25}P_{10}O_{90}(SiO_2)_{60}$ | 1 | Not conducted |
| Example 4 | $Fe_{10}Sb_{20}P_{10}Mo_{0.5}O_{81.5}(SiO_2)_{60}$ | 0.2 | " |
| Example 5 | $Fe_{10}Sb_{20}P_8V_{0.3}O_{75.75}(SiO_2)_{60}$ | 0.5 | " |
| Example 6 | $Fe_{12}Sb_{25}P_{10}W_{0.5}O_{94.5}(SiO_2)_{60}$ | 0.5 | Conducted |
| Example 7 | $Fe_{10}Sb_{20}P_{10}V_{0.3}Mo_{0.2}Cu_2Ni_2Te_{0.1}O_{85.55}(SiO_2)_{60}$ | <0 | " |
| Example 8 | $Fe_{10}Sb_{20}P_5V_{0.2}Co_1Mn_1Mg_{0.5}Bi_{0.2}B_{0.2}O_{71.1}(SiO_2)_{60}$ | 0 | Not conducted |
| Example 9 | $Fe_{10}Sb_{20}P_{15}V_{0.3}K_{0.2}Ce_{0.5}Ti_1Cr_{0.5}Zn_{0.5}O_{97.6}(SiO_2)_{60}$ | <0 | " |
| Example 10 | $Fe_{10}Sb_{20}P_{10}Mo_{0.5}Zr_2Al_{0.5}Ag_{0.1}Sn_2O_{90.35}(SiO_2)_{60}$ | 0.5 | " |
| Example 11 | $Fe_8Sb_{15}P_{20}W_1Pb_2La_{0.2}O_{95.3}(SiO_2)_{72}$ | 2 | " |
| Example 12 | $Fe_{10}Sb_{20}P_{10}V_{0.3}Mo_{0.2}Cu_2Ni_2Te_{0.1}O_{85.55}(SiO_2)_{60}$ | 2 | Conducted |
| Comparative Example 1 | $Fe_{10}Sb_{20}P_{10}Mo_{0.5}O_{81.5}(SiO_2)_{60}$ | 4 | Not conducted |
| Comparative Example 2 | $Fe_{12}Sb_{25}P_{10}W_{0.5}O_{94.5}(SiO_2)_{60}$ | 0.5 | Conducted |
| Comparative Example 3 | $Fe_{10}Sb_{14}P_{1.0}W_{0.5}O_{47}(SiO_2)_{20}$ | 2 | " |

| Example No. | Conditions of Heat Treatment Temperature (°C.) | Conditions of Heat Treatment Time (hr) | pH Adjustment before Spray Drying | pH before Spray Drying | Final Calcination Temperature (°C.) |
|---|---|---|---|---|---|
| Example 1 | — | — | Not conducted | 2 | 800 |
| Example 2 | 80 | 1 | Conducted | 1 | 750 |
| Example 3 | — | — | Not conducted | 1 | 750 |
| Example 4 | — | — | " | <0 | 800 |
| Example 5 | — | — | Conducted | 0.5 | 800 |
| Example 6 | 100 | 1 | Not conducted | 0.2 | 850 |
| Example 7 | 95 | 2 | Conducted | 1 | 700 |
| Example 8 | — | — | Not conducted | <0 | 850 |
| Example 9 | — | — | " | <0 | 750 |
| Example 10 | — | — | " | 0.5 | 700 |
| Example 11 | — | — | " | 2 | 650 |
| Example 12 | 100 | 3 | Conducted | <0 | 700 |
| Comparative Example 1 | — | — | Not conducted | 4 | 800 |
| Comparative Example 2 | 100 | 1 | Conducted | 3.5 | 850 |
| Comparative Example 3 | 100 | 4 | Not conducted | 0.9 | 830 |

TABLE 3

| Example No. | Apparent Bulk Density (g/ml) | Conditions of Activity Test | | Results of Activity Test | | | Attrition Resistance (R) |
|---|---|---|---|---|---|---|---|
| | | Temperature (°C.) | Contact Time (sec) | Yield (%) | Conversion (%) | Selectivity (%) | |
| Example 1 | 1.05 | 420 | 2.0 | 87.1 | 98.4 | 88.5 | 2.0 |
| Example 2 | 1.03 | 430 | 1.5 | 91.5 | 99.5 | 92.0 | 0.8 |
| Example 3 | 1.12 | 410 | 1.5 | 91.7 | 99.9 | 91.8 | 1.9 |
| Example 4 | 1.10 | 420 | 1.5 | 92.0 | 100 | 92.0 | 1.8 |
| Example 5 | 1.08 | 420 | 1.5 | 90.1 | 100 | 90.1 | 0.7 |
| Example 6 | 1.09 | 420 | 2.0 | 91.8 | 99.8 | 92.0 | 1.4 |
| Example 7 | 1.12 | 410 | 1.5 | 92.5 | 99.5 | 93.2 | 1.1 |
| Example 8 | 1.10 | 430 | 2.0 | 92.0 | 100 | 92.0 | 2.1 |
| Example 9 | 1.13 | 410 | 1.5 | 92.2 | 99.3 | 92.8 | 1.9 |
| Example 10 | 1.12 | 400 | 1.5 | 91.9 | 99.7 | 92.2 | 1.1 |
| Example 11 | 0.99 | 410 | 2.0 | 89.1 | 98.7 | 90.1 | 2.3 |
| Example 12 | 1.05 | 420 | 1.5 | 92.1 | 100 | 92.1 | 0.9 |
| Comparative Example 1 | 0.98 | 420 | 1.5 | 88.6 | 98.3 | 90.1 | 5.6 |
| Comparative Example 2 | 1.02 | 420 | 2.0 | 87.3 | 97.5 | 89.5 | 4.3 |
| Comparative Example 3 | 1.21 | 400 | 1.5 | 85.2 | 98.9 | 86.1 | 0.7 |

While the invention has been described in detail and with reference to specific embodiments thereof, it will be apparent to one skilled in the art that various changes and modifications can be made therein without departing from the spirit and scope thereof.

What is claimed is:

1. A process for preparing a metal oxide catalyst of high attrition resistance for a fluidized bed process, which comprises adjusting the pH of an aqueous slurry containing an iron compound, an antimony compound, a phosphorus compound, and a silica carrier material, with the atomic ratio of phosphorus to antimony being at least 0.1:1, to a pH of 3 or less, spray drying the slurry, and calcining the resulting particles to a final temperature of about 500° C. to about 900° C.

2. The process as claimed in claim 1, wherein said catalyst has a composition represented by the empirical formula:

$$Fe_a Sb_b P_c X_d Q_e R_f O_g (SiO_2)_h$$

wherein

X represents at least one element selected from the group consisting of V, Mo, and W;

Q represents at least one element selected from the group consisting of Li, Na, K, Cs, Be, Mg, Ca, Sr, Ba, Sc, Y, La, Ce, Pr, Nd, Sm, Th, U, Ti, Zr, Hf, Nb, Ta, Cr, Mn, Re, Co, Ni, Ru, Rh, Pd, Os, Ir, Pt, Cu, Ag, Au, Zn, Cd, Hg, Al, Ga, In, Tl, Ge, Sn, and Pb;

R represents at least one element selected from the group consisting of B, As, Bi, Se, and Te; and a, b, c, d, e, f, g, and h each represents the atomic ratio of the respective element for which they are subscripts, wherein a is from 5 to 15;

b is from 5 to 100;

c is from 1 to 30;

d is from 0 to 10;

e is from 0 to 15;

f is from 0 to 10;

g represents a number of oxygen corresponding to oxides formed by the combination of the above-mentioned components; and h is from 10 to 200; provided that the P/Sb atomic ratio is at least 0.1:1.

* * * * *